United States Patent [19]
Tarnopol et al.

[11] 3,721,595
[45] March 20, 1973

[54] APPLYING ELECTROCONDUCTIVE HEATING CIRCUITS TO GLASS

[75] Inventors: Milton S. Tarnopol, Brackenridge; Thomas P. Snyder, Pittsburgh, both of Pa.

[73] Assignee: PPG Industries, Inc., Pittsburgh, Pa.

[22] Filed: July 20, 1971

[21] Appl. No.: 164,262

Related U.S. Application Data

[60] Division of Ser. No. 838,163, July 1, 1969, Pat. No. 3,671,311, which is a continuation-in-part of Ser. Nos. 737,907, June 18, 1968, abandoned, and Ser. No. 826,433, May 21, 1969, abandoned.

[52] U.S. Cl. .......................156/89, 156/99, 156/106, 161/190, 161/193, 161/196, 161/199, 219/203
[51] Int. Cl. .............................................B32b 17/10
[58] Field of Search ..156/89, 99, 102, 106; 161/190, 161/193, 196, 199; 204/15, 20, 38, 39, 40, 41; 219/203; 117/211, 212, 213, 215, 217, 70, 71 R, 124; 65/60, 106, 107

[56] References Cited

UNITED STATES PATENTS

| | | | |
|---|---|---|---|
| 2,710,900 | 6/1955 | Linder | 117/211 |
| 2,954,454 | 9/1960 | Gaiser | 117/211 |
| 2,991,686 | 7/1961 | Boicey | 156/99 |
| 3,075,860 | 1/1963 | Veres | 117/211 |
| 3,282,772 | 11/1966 | Davis, Sr. | 156/106 |
| 3,457,138 | 7/1969 | Miller | 161/199 |
| 3,522,142 | 7/1970 | Wismer et al. | 156/99 |

*Primary Examiner*—Daniel J. Fritsch
*Attorney*—Chisholm & Spencer

[57] ABSTRACT

Applying a decorative coating of design of electroconductive material to a glass base. When the base is transparent, the resulting article is useful as a readily heated window from which fog and ice can be readily removed on heating. A frit composition having an appropriate coefficient of expansion, an appropriate maturing temperature, and which matures into a rough, porous coating, is applied to a glass sheet surface in the circuit pattern desired, the sheet is heated and then cooled rapidly to produce a tempered glass sheet having a rough, porous frit coating conforming to the pattern desired for the electroconductive heating circuit, and a conductive metal coating is selectively deposited on the rough, porous frit by electroless plating. The frit may be sensitized by incorporating a minor amount of a sensitizing metal therein or by applying a sensitizing composition.

10 Claims, 5 Drawing Figures

PATENTED MAR 20 1973

3,721,595

INVENTORS
MILTON S. TARNOPOL
THOMAS P. SNYDER

BY Chisholm and Spencer
ATTORNEYS

APPLYING ELECTROCONDUCTIVE HEATING CIRCUITS TO GLASS

CROSS-REFERENCE TO RELATED APPLICATIONS

This application is a division of application, Ser. No. 838,163 of Milton S. Tarnopol and Thomas P. Snyder, filed July 1, 1969, now U.S. Pat. No. 3,671,311, which, in turn, is a continuation-in-part of application, Ser. No. 737,907 of Milton S. Tarnopol, filed June 18, 1968 (now abandoned) and application, Ser. No. 826,433 of Milton S. Tarnopol and Thomas P. Snyder, filed May 21, 1969 (now abandoned).

BACKGROUND OF THE INVENTION

This invention relates to Applying Electroconductive Heating Circuits To Glass and particularly relates to a method of producing decorative patterns on glass. Such patterns also can be used in aircraft, architectural and automobile windows having electroconductive heating elements arranged as thin, substantially parallel, lines throughout their extent. The plurality of electroconductive heating elements extend between a pair of bus bars. In using windows of this kind, the bus bars are connected to a suitable source of voltage to pass an electric current through the electroconductive heating elements to remove moisture or ice that is deposited on a surface of the window.

Electrically heated windows of this type usually have their electroconductive heating elements composed of ceramic silver. In a typical commercial embodiment used in the prior art, the parallel resistance heating elements and the bus bars are formed of a typical ceramic conductive coating material comprising a conductive metal powder such as silver and a vitrifying binder.

The electroconductive heating elements form narrow conductive lines extending between the bus bars. The latter interconnect the ends of the heating elements and are approximately one-fourth inch wide whereas the heating elements are at most about one thirty-second inch wide. The silver-ceramic mixture is preferably applied through a stencil to form the design of stripes and bus bars by a process known as "silk screening" to form a pattern approximately 0.0005 inches thick.

Other electroconductive materials used for this purpose contain gold or mixtures of metallic silver and gold in combination with fusible ceramic mixes. However, the price of silver and gold makes it uneconomical to use these materials for electroconductive elements in articles where cost is an important commercial factor.

A purpose of the present invention is to provide relatively inexpensive materials for the heating elements in a heated window. While the present invention will be described in an environment where the window is used in an automobile having a 12 volt electrical supply system, where the resistance of the electroconductive heating elements is suitable to heat the window rapidly enough for practical purposes, it is understood that the principle of applying an electroconductive heating circuit to a transparent glass sheet is equally applicable to produce other articles of manufacture such as space heaters, aircraft windows, building and office windows, freezer doors, and the like, where the voltage requirements may be greater or less than that of the 12 volt system described. Systems up to 30 volts do not provide any electrical shock hazard, according to the Underwriter Laboratories code. In other uses where electroconductive properties are not important, the fabricated articles produced may be provided with pleasing designs of artistic value.

The recent development of electroless plating has provided an alternate method of producing articles having electrical and/or artistic properties. According to this development, an electroconductive metal may be directly deposited onto a glass surface after the latter has been made rough and porous by leaching and then sensitized. An obvious modification of this technique would be to selectively leach only those portions of the glass surface where the heating elements are desired by masking the remainder of the surface during leaching and sensitizing; then depositing the metal preferentially on the leached and sensitized portions by electroless deposit either before or after removing the mask. Unfortunately, no mask is known that is effective to establish a sharp boundary for leaching. Consequently, the conductive elements so formed have blurred boundaries which are annoying optically. In addition, variations in width cause variations in resistance along the length of the electrical heating elements, thus resulting in non-uniform heating. Furthermore, it is both time consuming and expensive to maintain a mask for the roughening or leaching step and remove the mask either before or after the electroless deposit.

SUMMARY OF THE INVENTION

In brief, the present invention comprises a novel combination of steps involving first applying a suitable rough, porous ceramic frit in a design conforming to that of the heating circuit desired onto the glass surface and then selectively depositing a metallic electroconductive circuit onto the rough, porous frit by electroless deposit.

The rough, porous ceramic material forming the first layer may comprise either a glassy or ceramic frit containing refractory abrasive powder in a liquid vehicle.

The silk screening technique described above provides a pattern having very distinct lines of demarcation between the coated and uncoated portions. The frit coated glass sheets are heated to fuse the ceramic frit-abrasive powder mixture to the glass and evaporate the viscous liquid vehicle in which the ceramic and abrasive particles are suspended. The heated sheet is then cooled rapidly to impart a temper to the glass and to maintain the lines of the frit in a rough, porous condition suitable for electroless deposit.

The frit is sensitized to provide the selective electroless deposit thereon without deteriorating the desired clarity of the glass substrate. A typical sensitizing operation comprises dipping the glass in an organic solvent followed by successive immersions in an aqueous solution of catalytic metal and an aqueous solution of a reducing agent, following each immersion with a water rinse. For example, cuprous ammonium hydroxide or stannous chloride serve as sources of catalytic metal and sodium borohydride is a suitable reducing agent. Another method for activating vitrified material such as glass is with a solution of nickel-chloro-palladate in an organic solvent and reducing said nickel-chloro-palladate at a high temperature to produce a nickel-palladium film which serves as a base for subsequent electrodeposition or electroless deposition. Other well known catalytic metals suitable for sensitizing a rough, porous frit include nickel and palladium.

Another technique for producing such articles involves eliminating the sensitizing step.

In brief, another aspect of the present invention comprises a novel combination of steps involving first applying a suitable rough, porous, ceramic frit composition containing a small amount of a sensitizing metal, such as one or more of the noble metals, such as gold, silver, platinum, palladium and rhodium, or copper, tungsten, iron and aluminum that consists essentially of a ceramic frit and abrasive powder suspended in a viscous liquid in a design conforming to that of the heat circuit desired onto the glass surface, and then selectively depositing a metallic electroconductive coating onto the rough, porous frit by electroless deposit. The sensitizing metal is dispersed throughout the frit composition by thoroughly mixing organic compounds of the sensitizing metals, such as noble metal resinates dissolved in an organic solvent, such as turpentine or pine oil or the like. The ingredients of the frit composition are mixed thoroughly and applied by a squeegee through a stencil according to the silk screening technique described above.

A pattern having very distinct lines of demarcation between the coated and uncoated portions results from said silk screening step. The frit coated glass sheets are heated to fuse the ceramic frit-abrasive powder mixture to the glass, to reduce the organic noble metal compounds to the noble metals and to evaporate the viscous liquid vehicle in which the ceramic and abrasive particles and noble metal atoms are suspended. The heated sheet is then cooled rapidly to impart a temper to the glass and to maintain the lines of the frit in a rough, porous condition suitable for electroless deposit.

The presence of the sensitizing metals in the frit sensitizes the coated portion of the glass base to permit the selective electroless metal deposit thereon. Since the atoms of sensitizing metals should be exposed throughout the electroless copper plating step, it is advisable to immerse the substrate coated with the fused, abrasive, noble metal-containing frit in a mild acidic solution that lightly etches the ceramic and abrasive frit components without adversely affecting the noble metal in the frit to expose the noble metal to the electroless plating composition. A suitable mildly acidic composition for this purpose is an aqueous solution of 10 to 25 per cent by weight of fluoboric acid containing 5 grams of sodium meta-silicate per liter of solution.

The presence of sensitizing metal atoms in the frit makes superfluous a typical sensitizing operation such as treating the coated glass with a solution of nickel-chloropalladate in an organic solvent and reducing said nickel-chloro-palladate at a high temperature to produce a nickel-palladium film which serves as a base for subsequent electrodeposition or electroless deposition or by using other well known catalytic metals suitable for sensitizing a rough, porous frit, such as nickel and palladium. The prior art sensitizing steps are relatively expensive as they involve the use of finely divided nickel or palladium metal or nickel-chloro-palladate, which are expensive.

The present invention uses either molecular dispersions of a sensitizing metal or a sensitizing metal mixture in the frit composition, or sensitizing compositions of the prior art, to sensitize the porous ceramic frit to enable the latter to selectively receive an electroless deposit.

A typical sensitizing operation used in the absence of incorporating atoms of sensitizing metal in the porous frit comprises dipping the glass base in an organic solvent followed by successive immersions in an aqueous solution of catalytic metal and an aqueous solution of a reducing agent following each immersion with a water rinse.

Various means of depositing electroconductive metals by electroless deposit are available. For example, an electroless copper solution comprising a source of cupric ions, hydroxyl radicals, formaldehyde and a hydroxy alkali substituted dialkylene triamine complexing agent alone or in combination with other known complexing agents provides rapid and even deposition of copper.

While copper is preferred because of its good electroconductivity and moderate cost, other metal coatings may be selectively deposited onto the sensitized frit pattern. The electroless plating art has developed techniques for the electroless deposition of nickel, cobalt, nickel-cobalt mixtures, chromium, iron and palladium. These techniques may be exploited in the present invention. However, some metals require galvanic initiation to start their electroless deposit.

Another reason for preferring copper as the metal to deposit by electroless plating is that its rate of deposit on a catalytic surface is far greater than that on a smooth glass surface so that virtually no copper deposits on the smooth glass when a sufficient coating forms on the pattern of catalytic metal. Other materials, such as nickel, deposit to a slight extent on the smooth glass when deposited electrolessly on the catalytic metal. However, the portion deposited on the smooth glass is readily removed by wiping without harming the deposit on the catalytic metal.

Electroless copper plating following selective application of a frit containing atoms of catalytic metal is a preferred technique because the copper deposits preferentially on the exposed atoms of catalytic metal rather easily and does not form on the untreated smoothly surfaced glass. Therefore, electroless copper plating avoids the need for the added step of preferential removal of the electroless metal from the uncoated glass surface portions by wiping or buffing that is sometimes needed for other metals applied by electroless plating.

Electroless plating produces a coating of metal at a limited rate of deposit, and a coating produced after a given duration of electroless plating may have insufficient conductivity for certain purposes. If the metal coating is produced too slowly by electroless plating, electroplating may be used to apply additional metal at a rapid rate after electroless plating produces a continuous base for electroplating. The nature of electroplating is such that it selectively deposits metal only onto an electroconductive surface connected to a cathode. Hence, electroplating rapidly increases the conductivity of the circuit formed by electroless deposition without affecting the glass substrate.

If the metal applied is one that oxidizes easily, such as copper, it may be protected by nickel plating and/or soldering. Another technique that may be used for protection against oxidation is electroplating. Wave or dip soldering are suitable techniques. The copper may also be coated by means of immersion tin or immersion gold solutions. Such plating or soldering applies a protective coating to the metal without depositing any material on the smooth glass surfaces that requires its removal. This technique provides an inexpensive process for making a durable and attractive electrical heating circuit which avoids the need for expensive metals such as silver or gold or expensive sensitizing compositions in large quantities.

The present invention will be understood more readily from a description of certain illustrative embodiments of the present invention that follows.

BRIEF DESCRIPTION OF THE DRAWINGS

In the drawings forming part of this description, wherein like reference numbers refer to like structural elements.

DESCRIPTION OF THE PREFERRED EMBODIMENTS

Figure 1:
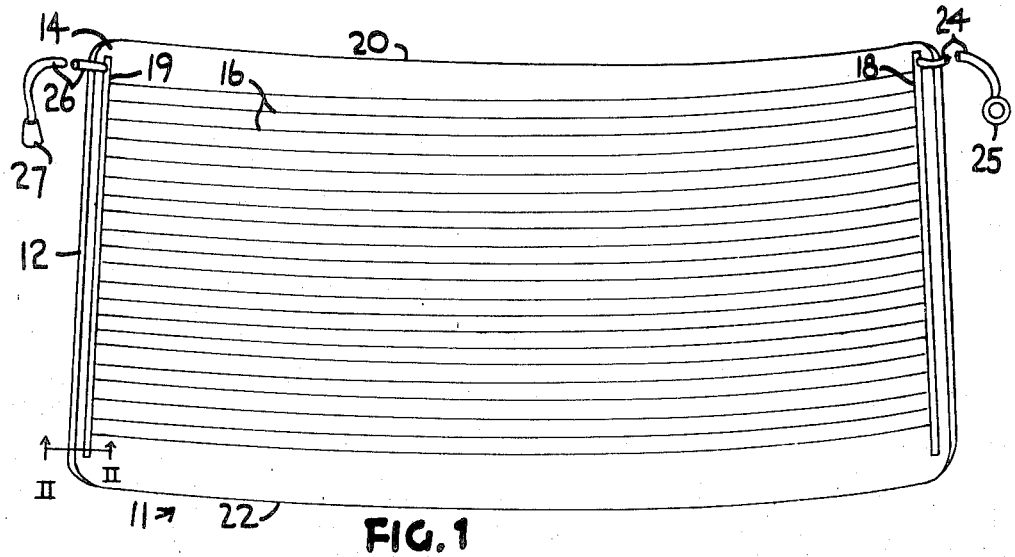
FIG. 1 is a full faced view of an automobile back window provided with electroconductive resistance heating elements arranged in the form of an electroconductive heating circuit.

Referring to the drawings, a curved automobile rear window 11 is shown in FIG. 1 having an outward facing uncoated surface 12 and an inward facing partly coated surface 14. A plurality of electroconductive heating elements 16 extends in substantially equally spaced and substantially parallel relation between a pair of bus bars 18 and 19. The latter extend substantially parallel to the opposite end edges of the window.

It is understood that many variations in heating circuits can be substituted for the one described above. For example, a series-parallel arrangement wherein separate switching arrangements can be applied to couple a selective part of the circuit to the heating source to promote more rapid heating in a critical area followed by general heating over the entire window may be used. Also, critical regions of the window may have their heating elements more closely spaced than in other regions of the window to provide a nonuniform heating pattern.

The electroconductive heating elements comprise narrow lines spaced approximately one inch from one another along the length of the window 11 and the bus bars 18 and 19 extend across the width of the window near the ends of the window. Each of the electroconductive elements 16 makes electrical contact with bus bar 18 at one end and with bus bar 19 at its other end.

When the window to be partly coated with such a design is a rectangle or a quadrilateral having substantially straight and parallel upper and lower longitudinal edges 20 and 22, the elongated electroconductive heating elements 16 are spaced about one inch apart and extend in straight, parallel lines from bus bar 18 to bus bar 19. When one or both of the upper and lower edges of the window are bowed and differ in configuration from one another, automobile stylists prefer that the elongated heating elements extend between the opposed bus bars in paths conforming to the longitudinal edges of the window. The uppermost heating element conforms in curvature substantially to the curvature of the upper longitudinal edge 20 of the window 11, and the lowest elongated electroconductive heating element conforms to the shape of its lower edge 22.

The ends of adjacent heating elements 16 at their points of contact with the bus bars are spaced approximately 1 inch from the corresponding end of the adjacent heating element connected to the same bus bar. If the upper and lower longitudinal edges of the window have different shapes, the configurations of the intermediate heating elements gradually change between adjacent elements to provide a gradual change from the configuration of the uppermost element to that of the lowest element.

The current in the electroconductive heating elements 16 resulting from subjecting the opposite bus bars 18 and 19 to a potential difference of 12 volts provides a substantially uniform heating pattern throughout the entire extent of the vision area of the window. This heating current suffices to clear a fogged window in the same or less time than it takes to scrape off an opaque deposit by hand. Furthermore, there is no need for an occupant to leave a vehicle in order to clear the windows when the present invention is used.

The electroconductive elements and the bus bars form a heating system when connected to an alternator coupled to the 12 volt battery of an automobile. A lead-in wire 24 having a terminal connection 25 adapted to connect the lead-in wire to an alternator is attached to bus bar 18. A similar lead-in wire 26 having a ground connection terminal 27 is similarly attached to bus bar 19.

Figure 2:
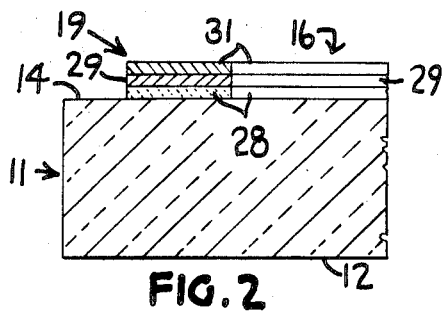
FIG. 2 is an enlarged cross-sectional view of a fragmentary portion of the window of FIG. 1 showing one embodiment of the invention.

In the embodiment depicted in FIG. 2, the upper partly coated surface 14 of glass sheet 11 is provided with a rough, porous undercoating 28. The latter may be composed of a porous, sensitized frit or of frit containing exposed atoms of a catalytic metal and an abrasive. An electroless metal coating 29, preferably copper, is superimposed over the undercoating 28, and a protective coating of nickel 31, may be optionally superimposed over the coating 29. Both the electroconductive heating elements 16 and the bus bars 18 and 19 are provided with the layers of the sensitized or catalytic metal-containing, porous, ceramic frit 28, electroless copper 29 and nickel plating 31 in the order named. If desired for esthetic purposes, a coating of nonelectroconductive material may be selectively superimposed over the nickel plating 31. The superimposed coating may be pigmented.

Figure 3:
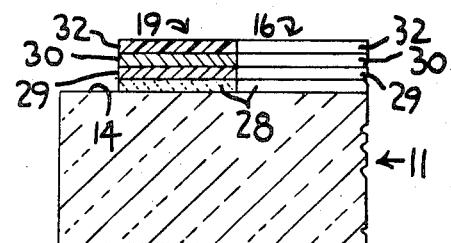
FIG. 3 is a view similar to FIG. 2 showing an alternate embodiment of the present invention.

In FIG. 3, an additional layer of copper 30 is deposited electrolytically on the electroless copper layer 29 to improve the conductivity of the elements 16 and the bars 18 and 19. An electrically insulated coating 32 may be selectively electropainted over the layer 30. The nickel coating 31 of the FIG. 2 embodiment may be superimposed over layer 30 instead of the coating 32 in this embodiment. Alternatively, both the nickel coating 31 and the insulated coating 32 may be applied in sequence.

Figure 4:
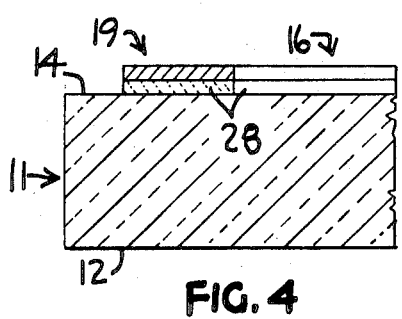
FIG. 4 is a view similar to FIGS. 2 and 3 showing still another embodiment of the present invention.

In FIG. 4, the nickel coating 31 is deposited directly onto the sensitized or catalytic metal-containing, porous coating 28 of frit by electroless deposit. Nickel is electroconductive as well as having desirable weathering properties, so it requires no protective coating. However, if desired for esthetic purposes, a non-conducting layer of pigmented material may be applied over the nickel coating 31 of this embodiment. Electropainting is a suitable method of selectively applying a non-conductive layer, which may be pigmented, onto the metal circuit already deposited without affecting the optical properties of the clear glass portion of the partly coated window.

Figure 5:
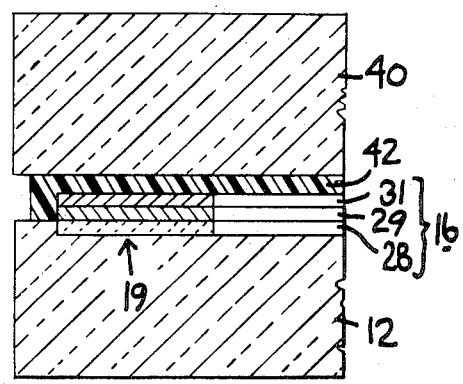
FIG. 5 is an enlarged cross-sectional view of a fragmentary portion of a glass plastic laminated window incorporating a glass sheet treated in accordance with the present invention.

In FIG. 5, a glass sheet 12 coated with a design as in FIG. 1 is shown laminated to another glass sheet 40 with a thermoplastic interlayer 42 of a suitable plastic resin such as plasticized polyvinyl butyral or a polyurethane layer between the coated and uncoated glass sheets. The design is applied in a series of grooves etched or sandblasted or formed by photofabrication on the glass surface 14.

The following examples provide detailed descriptions of steps used to produce electroconductive heating circuits by electroless plating that avoids the need for silver or gold or an expensive sensitizing step.

EXAMPLE I

A glass sheet to be coated with an electroconductive resistance heating element in a desired pattern is laid on a horizontal surface and a stencil conforming to the desired pattern aligned over the sheet. A suitable stencil is a 160 mesh nylon screen.

A composition containing between about 20 and 30 weight per cent of a powdered abrasive material, such as alundum, chromite, sand, silicon carbide and between about 80 and 70 weight per cent of powdered glass with suitable amounts of a flux, such as lead borate, and a coloring agent, such as a metallic oxide (for example, cobalt oxide with ferric oxide or manganese oxide for a black color) is prepared for application by taking the above powdered materials, in the proportions stated, and mixing them with an aqueous or an organic vehicle containing a small amount of a binding agent, such as sugar, molasses, varnish or oil. In case an organic vehicle is desired, turpentine or a mixture of mineral spirits and aromatic hydrocarbons sold by PPG Industries, Inc. under the trade name of LEPTYNE may be utilized. A suitable commercial product used for this purpose is sold by Harshaw Chemical Company as "E931 Matte Black Glass Enamel in Screen Oil 570."

The ceramic frit material so prepared or purchased is applied through the stencil onto the upper surface of the glass sheet by flexible squeegee using the so-called "silk-screening" technique. The glass sheet containing the frit deposited thereon is then heated to a temperature of from about 1100° F. to about 1200° F. to mature the frit, to cause the frit to develop a rough, porous surface, and to eliminate the organic material therefrom. The frit coated sheet is immediately chilled to temper the sheet, at least partially.

Twelve samples of commercial soda-lime-silica plate glass 6 inches by 6 inches by one-fourth inch thick were produced as described above using said "E931 Matte Black Glass Enamel in Screen Oil 570" as the ceramic frit. The pattern of frit comprised two strips each one-fourth inch wide extending along a pair of opposite edges and five lines of frit each one thirty-second inch wide and spaced about one inch apart interconnecting the two wider end strips. Six of the samples were heated for 7 minutes and six additional samples were heated for 8 minutes to bake the rough, porous frit patterns onto the samples. Each group of six samples were then treated as follows.

The samples were sensitized by treatment with a proprietary composition sold under the trade name CUPOSIT CATALYST 6F which was used at full strength as supplied for one minute at room temperature. The aforesaid CUPOSIT CATALYST 6F consists essentially of an aqueous colloidal mixture of palladium chloride, HCl, sodium stannate and stannous chloride such as depicted in Example II of U.S. Pat. No. 2,011,920. The samples were then rinsed twice in water and then were treated with another proprietary composition consisting essentially of fluoboric acid that is sold under the trade name of CUPOSIT ACCELERATOR SP, which was mixed in equal parts with deionized water, for 2 minutes at room temperature. This was followed by another water rinse. This completed the sensitizing portion of the treatment.

Of the six samples in each group treated as above, four were then treated at temperatures of 75° to 80° F with an electroless copper plating composition under the trade name of CUPOSIT COPPER MIX 97 for various periods outlined in Table I below. The "CUPOSIT COPPER MIX 97" comprised one part each of proprietary formulations 97A and 97B in concentrated form plus 6 1/2 parts of deionized water. CUPOSIT 97A consists essentially of an aqueous solution of cupric sulfate, formaldehyde and chelating agents comprising alkylene diamines and alkanolamines, while CUPOSIT 97B is a 9 normal solution of sodium hydroxide. The other two samples were treated at a temperature of about 190° to 195° F with another proprietary formulation "ELECTROLESS NICKEL NL-61," an electroless nickel plating composition which consisted of one part concentrate and two parts of deionized water. The concentrate consists essentially of a nickel sulfate, sodium hypophosphite and a mixture of hydroxycarboxylic acids. After a water rinse following the aforesaid electroless copper plating step, one of the first four samples from each group was then treated for five minutes at 190° F with said "ELECTROLESS NICKEL NL-61." All the samples were then air dried, inspected and measured for electrical resistance by contacting the wide stripes with electrodes connected to an ohmmeter.

In the table that follows, copper coatings were produced using said "CUPOSIT COPPER MIX 97," nickel coatings were produced using said "ELECTROLESS NICKEL NO-61," copper plus nickel refers to sequential contact by said copper coating composition followed by said nickel coating composition and the 7 or 8 following the sample number indicates whether the ceramic frit was heated for 7 minutes or for 8 minutes to fuse the frit. The resistance of the circuits was measured between the wide stripes at the opposite sides of the samples, which simulated bus bars.

TABLE I

| Sample Number | Coatings | Coating Time (minutes) | Resistance (ohms) |
|---|---|---|---|
| 1-7 | Copper | 10 | 2.5 |
| 1-8 | Copper | 10 | 1.8 |
| 2-7 | Copper | 20 | 2.0 |
| 2-8 | Copper | 20 | 1.7 |
| 3-7 | Copper | 30 | 1.75 |
| 3-8 | Copper | 30 | 1.75 |
| 4-7 | Copper + Nickel | 20 + 5 | 1.2 |
| 4-8 | Copper + Nickel | 20 + 5 | 1.0 |
| 5-7 | Nickel | 10 | 18.0 |
| 5-8 | Nickel | 10 | 22.0 |
| 6-7 | Nickel | 30 | 6.5 |
| 6-8 | Nickel | 30 | 5.25 |

After measuring the resistances listed above, samples 1-7, 3-8 and 6-8 were electroplated in a sulfuric acid-copper sulfate electroplating bath for the times and at the amperages indicated in Table II. The bath consisted of an aqueous solution containing by analysis 28.7 ounces of copper sulfate and 9.2 ounces of sulfuric acid per gallon of solution having a specific gravity of 1.16 at room temperature. Their resistances were measured after the electro-plating process and reported in Table II. Sample number 1-7 was electroplated two times.

TABLE II

| Sample Number | Electroplating Time (minutes) | Amperage | Resistance (ohms) Before | After |
|---|---|---|---|---|
| 1-7 | 7 | 3 | 2.5 | 0.207 |
| 1-7 | 7 | 5 | 0.207 | 0.07 |
| 3-8 | 15 | 4.5 | 1.75 | 0.187 |
| 6-8 | 15 | 4.5 | 5.25 | 0.067 |

The resistances measured after electroplating were in the range required for heating back windows about 60 inches long using a 12 volt system and electroconductive heating stripes spaced about one inch apart throughout the area to be cleared. It is understood that the resistance of the heating circuit can be controlled by varying the duration of the electroplating process and/or the current supplied for electroplating. The resistance desired depends on the ultimate use of the system. For example, higher voltages may require much thicker elements disposed more closely together to provide the greater heat required for such use.

The adhesion of all the coating appeared to be excellent. All the coatings adequately resisted removal by abrading with a fiber glass eraser or scratching with a razor blade.

The copper has a dull finish and the nickel is a dull gray as deposited. Abrading gives them some gloss if desired.

The bus bars are preferably soldered to bare copper lead-in wires and the entire assembly electropainted with an electrically insulating vehicle to selectively superimpose an insulator material over the electroconductive heating circuit. A typical suitable electropainting method comprises passing an electric current between the coating to be covered, which is established as an anode, and an electrically conductive metal cathode in contact with an aqueous bath containing a solubilized vehicle resin consisting essentially of the reaction product of an ester selected from the class consisting of drying oil fatty acid esters and semi-drying oil fatty acid esters and at least one acidic compound selected from the group consisting of anhydrides of alpha, beta-ethylenically unsaturated dicarboxylic acids, alpha beta-ethylenically unsaturated dicarboxylic acids which form anhydrides, fumaric acid, and mixtures thereof, said reaction product having between about 10 per cent and 50 per cent of its acidity neutralized. U.S. Pat. No. 3,366,563 to Donald P. Hart and Roger M. Christenson, assigned to PPG Industries, Inc. discloses various compositions used in an electropainting method of this type.

EXAMPLE II

A composition containing about 10 per cent by weight of calcined alumina, for example, a composition sold by the Drakenfeld Division of Hercules Incorporated, Washington, Pennsylvania, under the trade name of Drakenfeld No. 705 calcined alumina, and about 90 per cent by weight of a fusible ceramic enamel, such as one sold under the trade name of Drakenfeld No. 24-548 Black enamel, is thoroughly mixed and dispersed in a resinous screening oil, such as turpentine or pine oil or the like. An additive containing up to 10 per cent by weight of a noble metal luster, preferably one containing mixture of gold and palladium, such as a composition sold under the trade name of O'Hommel stamping bright palladium No. 338 by the O'Hommel Company, Carnegie, Pennsylvania, dissolved in an organic solvent, such as turpentine or pine oil, for example, is added.

A glass sheet, precut to the outline desired and which is to be fabricated into a bent, tempered backlight for an automobile, is supported in a horizontal plane at a coating station. The ceramic frit material mixed with the additive is applied through a stencil onto the upper surface of the glass sheet by a flexible squeegee using the so-called "silk-screening" technique while the sheet is so supported.

The glass sheet containing the frit deposited thereon is then conveyed through a tunnel-type furnace while supported on an outlined mold, where the sheet is heated to a temperature of about 1250° F. At this temperature, the glass sheet sags by gravity to conform to the shape formed on the upper edge surface of the outline mold. The elevated temperature also serves to fuse the frit, to cause the frit to develop a rough, porous surface, and to eliminate the organic material that serves as a vehicle for applying the frit containing the sensitizing metal through the screen in the heating circuit design desired. The frit coated sheet is immediately chilled to temper the sheet, at least partially. The resulting bent backlight has noble metal atoms dispersed throughout the circuit design.

The bent backlight is immersed in a mild, acidic, etching solution, preferably, an aqueous solution maintained at room temperature and containing 10 to 25 per cent by weight of fluoboric acid and 2 to 10 grams per liter of sodium meta-silicate for 30 to 300 seconds. This fluoboric acid treatment is of sufficient duration to mildly etch the frit coating and increase the number of noble metal atoms exposed to the electroless plating step that follows without affecting the surface finish and optical properties of the glass sample onto which the design has been deposited. The pattern of frit comprises two strips each one-fourth inch wide extending along a pair of opposite edges and lines of frit each one thirty-second inch wide and spaced about 1 inch apart interconnecting the two wider end strips.

A water rinse follows the fluoboric acid etching. The sample is then ready for electroless metal plating without requiring any further sensitizing.

The rinsed backlight is then treated with the aforesaid electroless copper plating composition sold under the trade name of "CUPOSIT COPPER MIX 97" at a temperature of 70° to 80° F for from 5 to 10 minutes. After a water rinse following the aforesaid electroless copper plating step, the backlight is then treated for five minutes at 190° F with the aforesaid "ELECTROLESS NICKEL NL-61."

If a non-conductive protector rather than nickel plating is desired, the sample is treated by electropainting directly onto the electroconductive coating deposited by using proprietary formulation "CUPOSIT COPPER MIX 97." As an alternative, electropainting can be applied to a nickel plating coating of an electroless copper plating previously deposited onto the porous frit containing noble metal material.

EXAMPLE III

The following experiments were performed on samples of plate glass of one-fourth inch nominal thickness and 6 inches square to demonstrate the feasibility of selective deposition of metal by electroless plating on a strip of abrasive ceramic frit containing a composition of the sensitizing metal tested that was applied in a strip one-fourth inch wide by "silk screening" the tested ceramic material across the entire width of the sample tested through a 160 mesh screen and then heating the coated sample for 7 minutes at 1200° F to simulate a bending operation.

The basic frit-abrasive composition used contained about 10 weight per cent of a powdered abrasive material, such as alundum (aluminum oxide powder calcined at 1950° F, whose average particle size is 2 to 10 microns and obtainable under the trade name of Drakenfeld calcined alumina No. 705, mixed with about 90 per cent by weight of an enamel composition. The enamel component of this composition was Drakenfeld 24-548 Black enamel. This composition has the following analysis: PbO—53%; $SiO_2$—32%/ $B_2O_3$ 3.25%; CdO—3.5%; $TiO_2$—3.25%; $Na_2O$—2.5 %; $ZrO_2$—1.0%; $Al_2O_3$—0.5% and NaF—0.25% plus pigments (Co, Fe and Cr) making up the balance. The basic composition has a coefficient of thermal expansion compatible with that of commercial sheet, plate or float glass and matures in the temperature range within which glass sheets are heated for bending and/or tempering.

The abrasive and enamel components were mixed together in the proportions enumerated. Then one part by weight of an oily mixture of pine oil and resin sold under the trade name of Drakenfeld 900 squeegee oil was mixed with 3 parts by weight of the mixture of abrasive and enamel to produce the basic frit composition to which tested components were added.

In Table III that follows, the additive composition depicted by its proprietary composition number was mixed in the proportion indicated with the basic frit-abrasive composition and the mixture of the additive and the basic composition applied by the "silk screening" technique in a stripe one-fourth inch wide. The additive composition consisted essentially of resinates of sensitizing metals, a fluxing agent and an adhesion promoting agent such as bismuth. After applying the mixture to be tested and heating each coated sample to simulate the temperature conditions normally met during bending, the heated sample was cooled and then immersed in an aqueous solution containing 12 per cent by weight of $HBF_4$ containing 5 grams per liter of sodium meta-silicate. The sample was then immersed in an electroless plating solution such as one of the proprietary compositions sold under the trade names of "CUPOSIT COPPER MIX 97" (an electroless copper composition hereinafter referred to as CU-97) or "ELECTROLESS NICKEL NL-61" (an electroless nickel composition referred to later as NL-61) for the period indicated. After the electroless deposit for the time indicated, the electrical resistance was measured along the length of the stripe and calculated to linear resistivity per inch of length. The per cent in the parentheses that follows each proprietary composition indicates the per cent of proprietary composition by weight added to the basic frit-abrasive composition taken as 100 per cent by weight. The results follow:

TABLE III

COMPARISON OF ELECTROLESS TREATMENTS

| Proprietary Composition | Sensitizing Metal in Mixture | HBF | Time (minutes) of Treatment in CU-97 | NL-61 | Resistivity (ohms/inch) |
|---|---|---|---|---|---|
| O'Hommell 338(1%) | 0.017%Pd; 0.049% Au | 1 | 5 | | 2.5 |
| O'Hommell 8428(1%) | 3% Pd; 3% Au | 1 | 5 | | 2 |
| O'Hommell 160(1%) | 3% Pd; 3% Rh 3% Au | 1 | 5 | | 0.68 |
| O'Hommell 9108(1%) | 3% Pd; 3% Rh 3% Au | 1 | 5 | | 0.45 |
| O'Hommell 338(1%) | 0.017% Pd; 0.049% Au | 3.5 | 5 | | 0.5 |
| O'Hommell 338(1%) | 0.017% Pd; 0.049% Au | 3.5 | 10 | | 0.2 |
| O'Hommell 338(1%) | 0.017% Pd; 0.049% Au | 3.5 | 10 | 11 | 0.18 |
| Dupont 7447 (2%) | 3% Pt; 3% Au | 3.5 | 5 | | 0.5 |

EXAMPLE IV

Since each of the above-identified additive compositions contained only about 10 to 20 per cent by weight of the sensitizing metal, it prompted the following experiments reported in TABLE IV to determine the minimum amount of noble metal needed in the frit-abrasive composition to produce an adequate copper film by electroless deposit. In all these experiments, O'-Hommell No. 338 was used as the source of noble metals.

TABLE IV

DETERMINATION OF MINIMUM PALLADIUM REQUIREMENT

| Palladium Composition Concentration | Time of Treatments (Minutes) $HBF_4$ | CU-97 | Result |
|---|---|---|---|
| 0.017% | 1 | 18 | No deposit |
| 0.1 % | 1 | 20 | Uneven deposit |
| 0.5 % | 1.5 | 7 | Excellent deposit |
| 0.1 % | 2 | 13 | Good deposit |

EXAMPLE V

Ceramic silver was tested as a base for electroless copper deposit. A smear of a silver flake in a ceramic binder sold under the trade name of Dupont 7713 was applied by silk screening onto a glass plate one-fourth inch thick and 6 inches square and heated for 7 minutes at 1200° F. After cooling, the coated glass sheet was immersed in CU-97 for 5 minutes. Copper deposited onto the silver frit, indicating that silver is also a good catalyst for this type of electroless copper plating.

EXAMPLE VI

Three laminates comprising a coated glass sheet, an uncoated glass sheet and an interlayer of plasticized polyvinyl butyral were prepared as follows: Six sheets of plate glass 28 inches by 28 inches by nine sixty-fourths inch were cut to outline. Three of these sheets were mounted on an outline mold and exposed to a normal production heating and bending cycle to sag bend the sheets into conformity with the outline shaping surfaces of the mold and then quenched to impart a temper to the shaped glass.

The other three sheets were coated with a pattern of ten parallel elongated ceramic lines interconnecting two cross lines in their central portion by the silk screening technique described above. The elongated lines were 22 inches long and one sixty-fourth inch wide and three-fourths inch apart. The cross lines were one-fourth inch wide, 10 inches long and extended 1 ½ inch inside the opposite longitudinal edges of the glass sheets.

The material used to apply the pattern by silk screening was made from the following components:
10 per cent by weight of calcined alumina (Drakenfeld No. 705)
90 per cent by weight of enamel (No. 24-548 Drakenfeld Black)

To 100 per cent by weight of the above mixture was added 0.2 per cent by weight of Hanovia 7611 palladium resinate and one-eighth per cent by weight of Hanovia 5499 gold luster. These additives are supplied by Englehard Industries and added approximately 0.4 per cent by weight of palladium and an approximately equal weight per cent of gold to the ceramic enamel. The coated glass sheets were then mounted on the mold used to bend the other three uncoated glass sheets with the coated surface facing upward. Each coated sheet was subjected to the same thermal treatment as the uncoated glass sheets. The coated sheets sagged to a shape having a concave elevation and also developed a temper.

The coated glass sheets were then removed, cooled and treated with a 12 per cent fluoboric acid solution containing 5 grams per liter of sodium metasilicate for 4 minutes at room temperature and rinsed in water. Then, each bent sheet with its coated surface facing upward was inserted in a plastic envelope of mylar coated with polyethylene and one gallon of a freshly prepared electroless copper plating composition consisting essentially of copper sulfate, sodium hydroxide, formaldehyde, ethylene diamine tetracetic acid and methyl dichloro silane as exemplified in Example II of U.S. Pat. No. 3,475,186 obtained under the brand name "CU-POSIT DUCTILE ELECTROLESS COPPER XP 6804-1" was inserted into the envelope and the sheet exposed for 45 minutes at 120° F. After removal, the glass sheet was rinsed with water and then exposed for 15 minutes to said "ELECTROLESS NICKEL NL-61" containing 2 parts of water to 1 part of concentrate. Electrical lead lines were soldered to the cross-lines.

Then, one of the coated bent glass sheets was assembled with one of the uncoated bent glass sheets and six interlayer sheets of plasticized polyvinyl butyral 0.030 inch thick each to form a glass-plastic sandwich having the coated surface of the coated glass sheet facing a surface of the polyvinyl butyral, which served as an interlayer. A suitable plasticizer for polyvinyl butyral in a glass-plastic laminate is disclosed in U.S. Pat. No. 2,274,672 to Brook J. Dennison.

The assembly of glass and plastic sheets was inserted in a plastic bag and subjected to an autoclave cycle of 45 minutes at 225 pounds per square inch and 275° F. Three transparent laminated glass assemblies resulted. The conductive lines had a silvery appearance from the inside and a black appearance from the outside.

The cross lines served as bus bars for the laminated glass windows so produced. A test of electrical resistance showed bus to bus resistances ranging from 0.7 ohms to 2 ohms in the windows. This range is suitable for defogging and di-icing operations with a 12 volt system used in autos at present.

It is also possible to laminate a coated glass sheet to an uncoated glass sheet of matching outline by using a polyurethane composition of the type disclosed in Canadian Pat. No. 673,678 to Vernon G. Ammons, Michael E. Dufala and Marco Wismer as the interlayer. The glass sheets are held in spaced relation to form the walls of a cell into which the polyurethane resin is cast and cured in place to produce a transparent laminate.

Electroconductive heating circuits having adequate electroconductive properties and different colors are obtained by employing adhesive-frit composition comprising from about 3 to about 30 parts by weight of a powdered abrasive material, such as alundum, chromite, sand, silicon carbide and between about 97 and about 70 parts by weight of powdered glass with suitable amounts of a flux, such as lead borate, and a coloring agent, such as a metallic oxide (for example, cobalt oxide with ferric oxide or manganese oxide for a black color, chrome oxide and mixes of chrome oxide with nickel, copper or uranium oxides for green colors, copper oxide for a light green color, mixes of tin oxide and a chrome chemical such as chromium oxide, iron chromate, potassium dichromate or lead dichromate for red colors, cobalt and copper oxides for blue colors, vanadium and tin oxides for yellow colors, manganese and iron oxides for brown colors and manganese dioxide for a purple color) is prepared by taking the above powdered materials in the proportions stated, mixing them with an aqueous or organic vehicle containing a small amount of a binding agent, such as sugar, molasses, varnish or oil. Turpentine and a mixture of mineral spirits and aromatic hydrocarbons sold by PPG Industries, Inc. under the trade name of LEPTYNE are suitable organic vehicles. To each 100 parts of the aforesaid powdered materials, up to 10 parts by weight of one or more sensitizing compositions of the type enumerated hereinabove are added to produce a frit composition that can be plated by electroless plating without requiring a sensitixing step. Thus, it is possible to comply with the esthetic requirements of automotive stylists by providing electroconductive lines having almost any color desired to match the color of the automobile body and have sufficient electroconductive properties to comply with the practical need to remove frost or mist from the window.

The form of the invention shown and described in this disclosure represents an illustrative preferred embodiment and certain modifications thereof. It is understood that various changes may be made without departing from the spirit of the invention by those skilled in the art. For example, a design or pattern may be etched or sandblasted into a glass surface or produced by photofabrication techniques or through a resist. The grooves so formed are then filled with a ceramic frit composition containing the sensitizing metal particles dispersed therein of the type described above, the excess frit composition is carefully removed by the so-called "doctor blading" technique, and the glass article is fired, and bent and/or tempered, treated with a mild acid and electrolessly plated using the technique described hereinabove with or without the added laminating step that forms the laminated window illustrated in FIG. 5.

We claim:

1. A method of forming a laminated glass assembly comprising depositing a pattern of electroconductive material on a transparent glass base which comprises partly coating said base with a frit sensitized to selectively receive an electroless plating thereon, fusing said frit to said base, exposing said partly coated transparent glass base to an electroless plating bath containing a salt of an electroconductive metal for sufficient time to deposit an electroconductive coating selectively onto said frit coating, and laminating said partly coated transparent glass base to another glass base.

2. A method of forming a laminated glass assembly comprising depositing a pattern of electroconductive material on a transparent glass base which comprises the following steps:
   1. applying a suspension of a finely divided ceramic frit in a viscous liquid onto a portion only of a surface of a transparent glass base, which portion conforms to the pattern desired,
   2. heating the coated glass sheet to an elevated temperature for sufficient time to evaporate said liquid and to fuse the frit to produce a rough, porous frit coating having a pattern conforming to that desired,
   3. rapidly cooling said frit coated glass sheet to harden said rough, porous frit coating and to impart at least a partial temper to the glass,
   4. sensitizing said rough, porous frit,
   5. exposing said partly coated transparent glass sheet to an electroless plating bath containing a salt of an electroconductive metal to deposit an electroconductive coating selectively onto said sensitized frit coating, and
   6. laminating said partly coated transparent glass sheet to another glass sheet.

3. The method as in claim 2, wherein said sensitizing step is performed between the fusing step and the electroless plating step and comprises treating the frit coated glass sheet with a sensitizing composition of a metal taken from the class of sensitizing metals consisting of cuprous copper, stannous tin, nickel, palladium and mixtures thereof.

4. The method as in claim 2, wherein said sensitizing step consists essentially of including a minor proportion of a sensitizing metal from the class consisting of palladium, platinum, gold, silver, rhodium, copper, iron, aluminum and tungsten and mixtures of at least two of said sensitizing metals in said finely divided ceramic frit.

5. The method as in claim 4, wherein said sensitizing metal is incorporated in the form of a soluble compound of said sensitizing metal.

6. The method as in claim 4, wherein said source of sensitizing metal is an organic solution of a mixture of organic compounds of at least two of said metals.

7. The method as in claim 4, further including the step of applying to said surface a mild, acidic, etching solution that does not harm the transparent glass base but that reacts with said frit for sufficient time to increase the number of free atoms of said sensitizing metal that is exposed but insufficient time to remove said frit completely after said rapid cooling step and before said exposure to said electroless bath.

8. The method as in claim 1, wherein said finely divided sensitized ceramic frit is applied along a series of elongated grooves previously formed along the surface area of said transparent glass sheet.

9. The method as in claim 2, wherein another glass sheet having an outline that matches that of said pattern coated glass sheet is assembled with said pattern coated glass sheet on opposite surfaces of an interlayer sheet of plasticized polyvinyl butyral with the coated surface facing said interlayer sheet and said glass sheets and interlayer sheet are laminated together under heat and pressure to produce a transparent laminate.

10. The method as in claim 2, wherein another glass sheet having an outline matching that of said pattern coated glass sheet, is assembled in spaced relation to said pattern coated glass sheet and said sheets are laminated together under heat and pressure with a polyurethane layer therebetween to produce a transparent laminate.

* * * * *